(12) United States Patent
Xiao et al.

(10) Patent No.: US 7,833,661 B2
(45) Date of Patent: Nov. 16, 2010

(54) ELECTROLYTES FOR LITHIUM ION SECONDARY BATTERIES

(75) Inventors: Feng Xiao, Shenzhen (CN); Mingxia Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 583 days.

(21) Appl. No.: 11/323,970

(22) Filed: Dec. 29, 2005

(65) Prior Publication Data

US 2006/0147808 A1    Jul. 6, 2006

(30) Foreign Application Priority Data

Dec. 31, 2004    (CN) ........................ 2004 1 0104032

(51) Int. Cl.
*H01M 4/60* (2006.01)
(52) U.S. Cl. ........................ 429/215; 429/188; 429/326; 429/330; 429/340; 429/199; 429/200; 429/329; 429/337; 252/62.2
(58) Field of Classification Search ................ 429/215, 429/188, 326, 330, 340, 199, 200, 329, 337; 252/62.2
See application file for complete search history.

(56) References Cited

U.S. PATENT DOCUMENTS

| 7,097,944 | B2 * | 8/2006 | Murai et al. ................. 429/330 |
| 7,223,502 | B2 * | 5/2007 | Onuki ......................... 429/326 |
| 7,282,304 | B2 * | 10/2007 | Kawai et al. ................ 429/340 |
| 7,297,447 | B2 * | 11/2007 | Kawai et al. ................ 429/340 |
| 2002/0110735 | A1 * | 8/2002 | Farnham et al. ............. 429/199 |

* cited by examiner

*Primary Examiner*—Laura S Weiner
(74) *Attorney, Agent, or Firm*—Venture Pacific Law, PC

(57) ABSTRACT

The present invention relates to additives for electrolytes of lithium ion secondary batteries that include one or more of the following: 1,3-propane sultone, succinic anhydride; ethenyl sulfonyl benzene, and halobenzene. It can also include biphenyl, cyclohexylbenzene; and vinylene carbonate. The weight of said 1,3-propane sultone is between 0.5 wt. % and 96.4 wt. %, said succinic anhydride is between 0.5 wt. % and 96.4 wt. %; said ethenyl sulfonyl benzene is between 0.5 wt. % and 95.2 wt. %; and said halobenzene is between 0.5 wt. % and 95.2 wt. % of the weight of the additive. Batteries with electrolytes containing said additives have improved over-charge characteristics and low temperature properties, and reduced gas generation during charging and discharging.

3 Claims, No Drawings

ELECTROLYTES FOR LITHIUM ION SECONDARY BATTERIES

CROSS REFERENCE

This application claims priority from a Chinese patent application entitled "Mixed Additives, Electrolytes and Lithium-Ion Secondary Batteries with said Additives" filed on Dec. 31, 2004 and having a Chinese Application No. 2004101040322. Said application is incorporated herein by reference.

FIELD OF INVENTION

This invention relates to electrolytes for lithium ion secondary batteries. Particularly, it relates to additives for electrolytes in lithium ion secondary batteries.

BACKGROUND

Since their commercial introduction more than a decade ago, lithium ion secondary batteries has rapidly gained in their market share, a rate of adoption by consumers that is unseen in Cd—Ni, MH—Ni, and lead-acid batteries. This rapid development is a result of their exceptional characteristics that include: a high operating voltage, a high relative energy, wide operation temperature range, low self-discharge rate, long cycling life, low energy loss, zero memory effect, pollution-free operation, and improved safety. Lithium-ion batteries are widely used as the power source in small and expensive electronic devices such as cellular phones, laptop computers, medical devices, video cameras, and digital cameras. They have also gradually replaced traditional batteries in aerospace, aviation, naval, satellite, telecommunication, and military applications.

Most newer lithium-ion batteries use carbon material for their negative electrodes. They use materials that can embed and detach lithium such as $LiCoO_2$, $LiNiO_2$, and $LiMn_2O4$ as materials for positive electrodes. The electrolyte of lithium-ion batteries generally comprises of organic solvents, electrolyte solids that are lithium salts, and additives. Organic solvents are the main constituent of electrolytes and they significantly affect the property of the electrolyte. Although there are many organic solvents and lithium salts, only a limited few can be used in lithium-ion batteries. Generally the electrolyte comprises a mixture of high dielectric constant solvents, low-viscosity solvents, and solvents that are electrochemically stabile, with wide electrical potential, wide operation temperature ranges, good heat stability, and low toxicity, are chemically stable, safe, and do not chemically react with the current collector and the active ingredients in the batteries.

The electrolyte is an important component of a battery, greatly affecting its properties. In traditional batteries, the electrolyte has an aqueous solution as the solvent. There are many choices for the aqueous solution as many chemicals dissolves well in water and the chemical and physical characteristics of many aqueous solutions are well understood. However, since the theoretical decomposition voltage of water is only 1.23V. Therefore, even when the overpotential of oxygen or hydrogen is taken into account, the maximum voltage is only about 2V for a battery with an electrolyte that comprises of aqueous solutions such as those in lead-acid secondary batteries. Traditional aqueous solutions cannot be used in lithium ion batteries as their voltage can reach as high as 3V to 4V. Therefore, the key to further development of lithium-ion batteries lies in the research of electrolyte solids and organic solvents that do not decompose at high voltage.

A number of problems exist in present lithium ion batteries. A common problem is that the gas generated during charging and discharging from the decomposition of the electrolyte on the surface of the negative electrode increases the thickness of the battery. The electrical conductivity rate of organic electrolytes is also low. In addition, the solvent is flammable and easily evaporates. When the battery is overcharged or short-circuited due to misuse, dangerous conditions such as an explosion can occur. The heat stability of lithium ion batteries poses another safety issue. When the heat generated by the reactions in the battery exceeds its ability to dissipate heat, the temperature of a battery can reach its ignition point, resulting in a fire or an explosion.

In recent years, adding additives is an important research approach to improve the properties of lithium ion batteries. Adding small amounts of certain chemicals, i.e., additives, to the electrolyte of a lithium ion secondary battery, can markedly improve certain properties such as the electrolyte's electrical conductivity rate and the battery's cycling efficiency and reversible capacity. These additives do not significantly increase the production costs of a battery but have the effect of substantially improving its performance.

Many patents have discussed the addition of additives to the electrolyte. Sanyo Company's Japanese Patent 2000-58112, Sony Company's Japanese Patent 2000-156243, and GS Company's Japanese Patent 2001-126765 disclosed that the addition of biphenyl could markedly improve a battery's ability to withstand over-charge. Mitsubishi Company's Japanese patent 2003-77478 disclosed that, by adding 0.02% to 0.1% of biphenyl in the positive electrode, over-charge could be effectively prevented after multiple cycles. Japanese Patent 2001-15155, jointly held by Sanyo Company and UBE, disclosed that, aromatic hydrocarbons such as cyclohexylbenzene are electrochemically active and can effectively prevent over-charge. When a battery is over-charged, excessive amounts of lithium ions escape from the positive electrode and embed in or accumulate on the negative electrode. As a result, the heat stability of the two electrodes is impaired such that the positive electrode becomes prone towards decomposition. The positive electrode would then release oxygen that can catalyze the decomposition of the electrolyte, creating large amounts of heat. The active lithium accumulated on the negative electrode can easily react with the solvent, releasing heat and converting chemical energy into heat energy. The temperature of the battery rises rapidly. As the temperature rises, the electrolyte participates in almost all the reactions within the battery. These reactions include the electrolyte's reactions with the material for the positive electrode, the lithium embedded in the carbon, lithium metal, and the self-decomposition reaction of the electrolyte.

Adding biphenyl, cyclohexylbenzene, or a mixture of both to the electrolyte can prevent over-charge to a certain degree. However, by doing so, the properties of the battery at low temperatures are affected negatively. In addition, the thickness of the battery increases as a result of the large quantity of gas that is generated during the charge and discharge. Even when the additives generate only a small amount of gas, the over-charge and low-temperature properties of the battery may not be good. However, when the additives results in good over-charge properties, the battery may produce large quantities of gas and also may not have good discharge properties at low temperatures.

Due to the limitations of the prior art, it is therefore desirable to have novel additives for electrolytes that can be used in lithium ion batteries and produce batteries with good low temperature properties, over-charge properties, and batteries that generate less gas during charge and discharge.

SUMMARY OF INVENTION

An object of this invention is to provide additives for lithium ion secondary batteries that can effectively improve a battery's over-charge properties, reduce the amount of gas generated during charging and discharging, and improve the low-temperature properties of a battery.

The present invention relates to additives for electrolytes of lithium ion secondary batteries that include one or more of the following: 1,3-propane sultone, succinic anhydride; ethenyl sulfonyl benzene, and halobenzene. It can also include biphenyl, cyclohexylbenzene; and vinylene carbonate. The weight of said 1,3-propane sultone can be between 0.5 wt. % and 96.4 wt. %, said succinic anhydride can between 0.5 wt. % and 96.4 wt. %; said ethenyl sulfonyl benzene can be between 0.5 wt. % and 95.2 wt. %; and said halobenzene can be between 0.5 wt. % and 95.2 wt. % of said additive.

An advantage of this invention is the additives for lithium ion secondary batteries of this invention that can effectively improve a battery's over-charge properties such that under over-charge conditions, a battery with said additives is reliable, safe, and not prone to fire or explosion.

Another advantage of this invention is that the additives for electrolytes of lithium ion secondary batteries of this invention can effectively reduce the amount of gas generated during charging and discharging thus reducing the thickness of the battery.

Another advantage of this invention is that the additives for electrolytes of lithium ion secondary batteries of this invention can effectively improve the low-temperature properties of a battery such that when the battery is discharged at low temperatures, it has a high capacity, a high medium voltage, and a low internal resistance.

Another advantage of this invention is that the additives for electrolytes of lithium ion secondary batteries of this invention it can improve the high temperature properties of a battery such that the battery can be stored at high temperatures and has a small recovery thickness.

DETAILED DESCRIPTION OF THE PREFERRED EMBODIMENTS

The presently preferred embodiments of the present invention are electrolytes with additives that comprising of one or more of the following: 1,3-propane sultone, succinic anhydride, ethenyl sulfonyl benzene, and halobenzene. Preferably, it should also contain biphenyl; cyclohexylbenzene; and vinylene carbonate. The preferred weight of the said 1,3-propane sultone is between 0.5 wt. % and 96.4 wt. %, said succinic anhydride is between 0.5 wt. % and 96.4 wt. %, said ethenyl sulfonyl benzene is between 0.5 wt. % and 95.2 wt. %; and said halobenzene is between 0.5 wt. % and 95.2 wt. %; said biphenyl is 0.5 wt. % and 95.2 wt. %; said cyclohexylbenzene is between 1.0 wt. % and 93.7 wt. %; and, said vinylene carbonate is between 0.5 wt. % and 93.0 wt. % of the weight of said additive.

Moreover, the weight of said additive can be between 2 wt. % and 20 wt. % of the weight of the electrolyte.

In other embodiments, the weight of said 1,3-propane sultone can be between 0.1 wt. % and 8.0 wt. %; the weight of said succinic anhydride can be between 0.1 wt. % and 8.0 wt. %; said ethenyl sulfonyl benzene can be less or equal to 6.0 wt. %; said halobenzene can be less than or equal to 6.0 wt. %; said biphenyl can be between 0.1 wt. % and 6.0 wt. % biphenyl; said cyclohexylbenzene can be between 0.1 wt. % and 6.0 wt. %; and said vinylene carbonate can be between 0.1 wt. % and 4.0 wt. % of the weight of said electrolyte.

Said halobenzene can be a halobenzene of one or more of its substitute. It can also be a haloalkylbenzene. The preferred selection is fluorobenzene, chlorobenzene, bromobenzene, or iobenzene. Optimally, the halobenzene should be fluorobenzene, chlorobenzene, and bromobenzene.

When the additive of an electrolyte that is an embodiment is dissolved in the electrolyte of a lithium ion secondary battery, it can suppress the decomposition of solvents such as dimethyl carbonate, diethyl carbonate, ethylene carbonate, propylene carbonate, ethyl methyl carbonate, butylene carbonate, methyl ethylene carbonate, and diethyl carbonate in the electrolyte. By doing so, the additive reduces greatly or even stops the generation of gas by the decomposition of the solvents, thereby eliminating the danger of explosion from gas accumulation, improving the heat stability of the electrolyte, and enhancing the efficient use of the electrolyte. The additive also suppresses the polarization of the lithium ion in the solid particles in the materials for the positive and negative electrodes. The electrochemical properties of the carbon negative electrode is improved by the additives as these additives can reduce the irreversible capacity of the lithiumized graphite negative electrode, and the transmission impedance of the lithium ion in the positive and the negative electrodes.

Electrolytes that are embodiments can also improve a battery' low temperature properties as the additives in said electrolytes can stop the battery from prematurely reaching the terminal voltage of discharge at low temperatures. More importantly, the additive in said electrolytes that are embodiments can easily polyreact to form a thin layer of electrically insulating superpolymer, covering the surface of the positive electrode, or further blocking the separator. By doing so, the additive increases the reliability and safety of the battery and reduces the danger of the explosion or fire when the battery is overcharged.

Lithium ion secondary batteries with electrolytes that are embodiments of this invention have the following advantages: (a) good low-temperature discharge properties. When discharged at low temperatures, batteries have a high capacity, high medium voltage, and low ending inner-resistance; (b) good over-charge properties. When overcharged, batteries are reliable and safe from explosion or fire; (c) low generation of gas during charge and discharge. With less gas generation, the increase in the thickness of the battery is reduced; and (d) good high temperature properties. Batteries can be stored at high-temperatures and have a small recovery thickness.

The embodiments of said electrolyte can also contain one or more organic solvents. These organic solvents can be any of those being used in current technology for in lithium ion batteries. These solvents include, but are not limited to, one or more of the following: dimethyl carbonate (DMC), diethyl carbonate (DEC), ethylene carbonate (EC), propylene carbonate (PC), ethyl methyl carbonate (EMC), butylene carbonate (BC), and methyl ethylene carbonate (MEC). The quantity of said organic solvent or solvents can be any of the customary quantities of organic solvents currently being used in lithium ion batteries. For example, the amount of organic solvent can be between 70 wt. % and 95 wt. % of the weight of the electrolyte.

The embodiments of said electrolyte can also contain electrolyte solids that are lithium salts that are currently used in lithium ion secondary batteries. These lithium salts include, but are not limited to, one or more of the following: lithium perchlorate, lithium hexafluoride phospho, lithium hexafluoride arsenate, and lithium perfluoride boric acid. The concentration of said lithium salt can be the commonly used concentrations of lithium salts in current lithium ion secondary batteries. For example, the concentration of lithium salts can be between 0.6 mol/L and 1.4 mol/L.

A method for fabricating electrolytes that are embodiments of this invention include the following steps:

adding said additive that are embodiments to an organic solvent. The individual ingredients in said additive can be added and mixed together before being added to the organic solvent. In the alternative, the ingredients in said additive can be added individually to the organic solvent in any order with being mixed together beforehand;

dissolving the lithium salt or salts in the organic solvent with said additive;

sealing the organic solvent with said additive and dissolved lithium salt;

heating the sealed organic solvent with said additive and dissolved lithium salt at a temperature between 50° C. and 70° C. for 20 to 30 minutes to rapidly dissolve any precipitate or any material causing turbidity to obtain the electrolyte that is an embodiment.

Another method for fabricating electrolytes that are embodiments of this invention include the following steps:

dissolving the lithium salt or salts in the organic solvent;

adding the additive to said organic solvent with said dissolved lithium salt or salts. The individual ingredients in said additive can be added and mixed together before being added to the organic solvent. In the alternative, the ingredients in said additive can be added individually to the organic solvent in any order with being mixed together beforehand;

sealing the organic solvent with said additive and dissolved lithium salt;

heating the sealed organic solvent with said additive and dissolved lithium salt at a temperature between 50° C. and 70° C. for 20 to 30 minutes to rapidly dissolve any precipitate or any material causing turbidity to obtain the electrolyte embodiment.

The electrolytes that are embodiments of this invention can be used as the electrolyte when fabricating lithium ion batteries. The positive electrode, negative electrode, separator to be used in said batteries can be any positive electrode, negative electrode, or separators currently being used in lithium ion batteries.

The following embodiments further describe this invention.

Embodiment 1

The fabrication of the electrolyte includes the following steps:

mixing ethylene carbonate, ethyl methyl carbonate, and dimethyl carbonate at a ratio of 1:1:1;

adding $LiPF_6$ as the electrolyte solid to form an electrolyte solution with a concentration of 1 mol/L;

adding the additive to said solution; and heating said solution with said additive at 50° C. to dissolve said additive to form the electrolyte of this embodiment.

The weight of the ingredients in the additive as a weight percentage of the weight of the electrolyte is: vinylene carbonate (0.5 wt. %), biphenyl (0.5 wt. %), cyclohexylbenzene (1.0 wt. %), 1,3-propane sultone (0.5 wt. %), and ethenyl sulfonyl benzene (0.5 wt. %). The additive is 3 wt. % of the total weight of the electrolyte.

The fabrication of the positive electrode include the following steps:

dissolving 90 grams of poly (vinylidene finoride) (ATOFINA, 761 # PVDF) in 1350 grams of N-methyl-2-pyrrolidone (NMP) solution to form a binding solution;

adding 2895 grams of $LiCoO_2$ (FMC company product) to said binding solution;

mixing well to form the positive electrode slurry;

evenly spreading the positive electrode slurry on an aluminum foil at a thickness of 20 μm;

drying the positive electrode slurry on the aluminum foil at 125° C. for one hour; and pressing it to form the positive electrode plate with a thickness of 125 μm.

The fabrication of the negative electrode includes the following steps:

dissolving 30 grams of carboxymethyl cellulose (CMC) (Jiangmen Quantum Hi-tech Biological Engineering Co., Ltd., model CMC1500) and 75 grams of butylbenzene rubber (SBR) latex (Nangtong Shen Hua Chemical Industrial Company Limited product, model TAIPOL1500E) in 1875 grams of water to form a binding solution;

adding 1395 grams of graphite (SODIFF company product, model DAG84) to said binding solution;

mixing the graphite well in said solution to form the graphite negative electrode slurry;

evenly spreading the negative electrode slurry on a copper foil to a thickness of 12 μm;

drying the negative electrode slurry on the copper foil at 125° C. for one hour; and pressing it to form a negative electrode plate with a thickness of 125 μm.

The fabrication of the battery include the following steps:

folding and winding said positive electrode plate, negative electrode plate and a polypropylene separator with a thickness of 20 μm to form the core of a square lithium-ion battery;

placing the battery core in a battery shell;

welding;

injecting the electrolyte fabricated above into the battery shell; and sealing the shell to make the Model 453450A lithium ion secondary battery.

Embodiment 2

The fabrication of the electrolyte includes the following steps:

mixing ethylene carbonate, ethyl methyl carbonate and dimethyl carbonate at a ratio of 1:1:1;

adding $LiPF_6$ as the electrolyte solid to form an electrolyte solution with a concentration of 1 mol/L;

adding the additive to said solution; and heating said additive in said solution at 60° C. to dissolve the additive to form the electrolyte of this embodiment.

The weight of the ingredients in the additive as a weight percentage of the weight of the electrolyte is: vinylene carbonate (1.0 wt. %), biphenyl (3 wt. %), cyclohexylbenzene (0.5 wt. %), 1,3-propane sultone (2.0 wt. %), and ethenyl sulfonyl benzene (2.0 wt. %). The additive is 8.5% of the total weight of the electrolyte.

The lithium-ion battery in this embodiment is fabricated with the same method as that in Embodiment 1 using the electrolyte fabricated in this embodiment.

Embodiment 3

The fabrication of the electrolyte include the following steps:

mixing ethylene carbonate, ethyl methyl carbonate, and dimethyl carbonate at a ratio of 1:1:1;

adding $LiPF_6$ as the electrolyte solid to form an electrolyte solution with a concentration of 1 mol/L;

adding the additive to said solution; and heating said solution with said additive at 70° C. to dissolve the additive to form the electrolyte of this embodiment.

The weight of the ingredients in the additive as a weight percentage of the electrolyte is: vinylene carbonate (2.0 wt. %), biphenyl (2.0 wt. %), cyclohexylbenzene (3.0 wt. %), succinic anhydride (3.0 wt. %), and ethenyl sulfonyl benzene (2.0 wt. %). The additive is 12 wt. % of the total weight of the electrolyte.

The lithium-ion battery in this embodiment is fabricated with the same method as that in Embodiment 1 using the electrolyte fabricated in this embodiment.

Embodiment 4

The fabrication of the electrolyte include the following steps:

mixing ethylene carbonate and diethyl carbonate at a ratio of 1:1;

adding $LiPF_6$ as the electrolyte solid to form an electrolyte solution with a concentration of 0.9 mol/L;

adding the additive to said solution; and heating said solution with said additive at 70° C. to dissolve the additive to form the electrolyte of this embodiment.

The weight of the ingredients in the additive as a weight percentage of the weight of the electrolyte is: vinylene carbonate (1.5 wt. %), biphenyl (1 wt. %), cyclohexylbenzene (4 wt. %), 1,3-propane sultone (3 wt. %), and ethenyl sulfonyl benzene (4 wt. %). The additive is 13.5% of the total weight of the electrolyte.

The lithium-ion battery in this embodiment is fabricated with the same method as that in Embodiment 1 using the electrolyte fabricated in this embodiment.

Embodiment 5

The fabrication of the electrolyte includes the following steps:

mixing ethylene carbonate and diethyl carbonate at a ratio of 1:1;

adding $LiPF_6$ as the electrolyte solid to form an electrolyte solution with a concentration of 0.9 mol/L;

adding the additive to said solution;

heating said solution with said additive at 70° C. to dissolve said additive to form the electrolyte of this embodiment.

The weight of the ingredients in the additive as a weight percentage of the weight of the electrolyte is: vinylene carbonate (3 wt. %), biphenyl (5 wt. %), cyclohexylbenzene (1 wt. %), 1,3-propane sultone (5 wt. %), and ethenyl sulfonyl benzene (3 wt. %). The additive is 17 wt. % of the total weight of the electrolyte.

The lithium-ion battery in this embodiment is fabricated with the same method as that in Embodiment 1 using the electrolyte fabricated in this embodiment.

Embodiment 6

The fabrication of the electrolyte includes the following steps:

mixing ethylene carbonate and diethyl carbonate at a ratio of 1:1;

adding $LiPF_6$ solid as the electrolyte solid to form an electrolyte solution with a concentration of 0.9 mol/L;

adding the additive to the solution;

heating said solution with said additive at 70° C. to dissolve said additive to form the electrolyte of this embodiment.

The weight of the ingredients in the additive as a weight percentage of the weight of the electrolyte is: vinylene carbonate (2 wt. %), biphenyl (1.5 wt. %), cyclohexylbenzene (6.5 wt. %), 1,3-propane sultone (4 wt. %), and ethenyl sulfonyl benzene (5 wt. %). The additive is 19 wt. % of the total weight of the electrolyte.

The lithium-ion battery in this embodiment is fabricated with the same method as that in Embodiment 1 using the electrolyte fabricated in this embodiment.

Embodiment 7

The fabrication of the electrolyte includes the following steps:

mixing ethylene carbonate, ethyl methyl carbonate, and dimethyl carbonate at a ratio of 1:1:1;

adding $LiPF_6$ as the electrolyte solid to form an electrolyte solution with a concentration of 1 mol/L;

adding the additive to said solution; and heating said solution with said additive at 50° C. to dissolve said additive to form the electrolyte of this embodiment.

The weight of the ingredients in said additive as a weight percentage of the weight of the electrolyte is: vinylene carbonate (0.5 wt. %), biphenyl (0.5 wt. %), cyclohexylbenzene (1.5 wt. %), and 1,3-propane sultone (1 wt. %), and fluorobenzene (0.5 wt. %). The additive is 4 wt. % of the total weight of the electrolyte.

The lithium-ion battery in this embodiment is fabricated with the same method as that in Embodiment 1 using the electrolyte fabricated in this embodiment.

Embodiment 8

The fabrication of the electrolyte includes the following steps:

mixing ethylene carbonate, ethyl methyl carbonate, and dimethyl carbonate at a ratio of 1:1:1;

adding $LiPF_6$ as the electrolyte solid to form an electrolyte solution with a concentration of 1 mol/L;

adding the additive to said solution; and heating said solution with said additive at 70° C. to dissolve said additive to form the electrolyte of this embodiment.

The weight of the ingredients in the additive as a weight percentage of the weight of the electrolyte is: vinylene carbonate (1 wt. %), biphenyl (4 wt. %), cyclohexylbenzene (1 wt. %), succinic anhydride (2 wt. %), and chlorobenzene (2 wt. %). The additive is 10% of the total weight of the electrolyte.

The lithium-ion battery in this embodiment is fabricated with the same method as that in Embodiment 1 using the electrolyte fabricated in this embodiment.

Embodiment 9

The fabrication of the electrolyte includes the following steps:

mixing ethylene carbonate, ethyl methyl carbonate, and dimethyl carbonate at a ratio of 1:1:1;

adding $LiPF_6$ as the electrolyte solid to form an electrolyte solution with a concentration of 1 mol/L;

adding the additive to said solution;

heating said solution with said additive at 50° C. to dissolve said additive to form the electrolyte of this embodiment.

The weight of the ingredients in the additive as a weight percentage of the weight of the electrolyte is: vinylene carbonate (2 wt. %), biphenyl (3 wt. %), cyclohexylbenzene (3 wt. %), and 1,3-propane sultone (2 wt. %). The additive is 10% of the total weight of the electrolyte.

The lithium-ion battery in this embodiment is fabricated with the same method as that in Embodiment 1 using the electrolyte fabricated in this embodiment.

Embodiment 10

The fabrication of the electrolyte includes the following steps:

mixing ethylene carbonate and diethyl carbonate at a ratio of 1:1;

adding $LiPF_6$ as the electrolyte solid to form an electrolyte solution with a concentration of 0.9 mol/L;

adding the additive to said solution;

heating said solution with said additive at 70° C. to dissolve said additive to form the electrolyte of this embodiment.

The weight of the ingredients in the additive as a weight percentage of the weight of the electrolyte is: vinylene carbonate (5 wt. %), biphenyl (1 wt. %), cyclohexylbenzene (2 wt. %), and 1,3-propane sultone (0.5 wt. %). The additive is 8.5% of the total weight of the electrolyte.

The lithium-ion battery in this embodiment is fabricated with the same method as that in Embodiment 1 using the electrolyte fabricated in this embodiment.

Comparison Example 1

The fabrication of the electrolyte includes the following steps:

mixing ethylene carbonate, ethyl methyl carbonate, and dimethyl carbonate are at a ratio of 1:1:1;

adding $LiPF_6$ as the electrolyte solid to form an electrolyte solution of this comparison example with a concentration of 1 mol/L.

The lithium-ion battery in this embodiment is fabricated with the same method as that in Embodiment 1 using the electrolyte fabricated in this embodiment.

Comparison Example 2

The fabrication of the electrolyte includes the following steps:

mixing ethylene carbonate and diethyl carbonate at a ratio of 1:1;

adding $LiPF_6$ as the electrolyte solid to form an electrolyte solution of this comparison example with a concentration of 0/9 mol/L.

The lithium-ion battery in this embodiment is fabricated with the same method as that in Embodiment 1 using the electrolyte fabricated in this embodiment.

Testing of Batteries' Properties

The lithium-ion secondary batteries of Embodiments 1 through 10 and Comparison Examples 1 and 2 are tested as follows:

First, the increases in battery thickness after its initial charge and discharge are measured. Each battery is charged for the first time and the increase in battery thickness after its initial charging is measured. This increase in battery thickness is defined as the difference between the thickness of a battery charged for the first time to a voltage of 3.9V and that of the battery before its initial charging. Each battery is then discharged for the first time. The increase in battery thickness after its initial discharging is measured. The increase in thickness after its initial charge is defined as the difference between the thickness of a battery charged for the first time to a voltage of 4.12V and that of the battery after being discharged to a voltage of 3.0V. The results of this testing are shown in Table 1.

The standard capacity of lithium ion secondary batteries of Embodiments 1 through 10 and Comparison Examples 1 and 2 are obtained and the results are shown in Table 1. The method for obtaining the standard capacity for a battery is as follows: A battery is charged with 1 CmA at constant current and constant voltage to 4.12V. The battery is then discharged with 1 CmA to 3.0V. The capacity released by the battery after charging, i.e., discharging current (MA)*discharge time (h) is the standard capacity.

TABLE 1

|  | Increase in Thickness after Initial Charge (mm) | Increase in Thickness After Initial Discharge (mm) | Standard Capacity (mAh) |
| --- | --- | --- | --- |
| Embodiment 1 | 0.752 | 0.178 | 815 |
| Embodiment 2 | 0.766 | 0.179 | 819 |
| Embodiment 3 | 0.755 | 0.182 | 811 |
| Embodiment 4 | 0.762 | 0.184 | 812 |
| Embodiment 5 | 0.778 | 0.182 | 815 |
| Embodiment 6 | 0.796 | 0.198 | 814 |
| Embodiment 7 | 0.753 | 0.182 | 810 |
| Embodiment 8 | 0.742 | 0.178 | 811 |
| Embodiment 9 | 0.715 | 0.178 | 810 |
| Embodiment 10 | 0.716 | 0.181 | 810 |
| Comparison Example 1 | 0.912 | 0.218 | 813 |
| Comparison Example 2 | 0.920 | 0.223 | 812 |

The results in Table 1 show that the capacities of batteries with electrolytes that are embodiments of this invention and the capacities of those batteries with electrolytes fabricated in the Comparison Examples are basically the same. However, the increase in thickness after the charging or discharging of the batteries with electrolytes that are embodiments is distinctly smaller than that of the batteries with electrolytes that are fabricated in the Comparison Examples. The results show that batteries with electrolytes that are embodiments generate less gas during the charging or discharging than batteries with electrolytes that are fabricated in the Comparison Examples.

The overcharge properties of the lithium ion secondary batteries of embodiments 1 through 10 and Comparison Examples 1 and 2 are tested and the results are shown in Table 2. The testing method for each battery includes the following steps:

discharging with 1 C at constant current to 3.0V;

adjusting the value of the output current of a constant current and constant voltage electrical to that required by the over-charge test by using a universal meter;

adjusting the output voltage to about 1V higher than the required over-charge voltage limit;

attaching the temperature sensor of a thermocouple sensor to the middle of the battery's side with heat-resistant tapes;

covering the surface of the battery with a layer of asbestos having a thickness of 12 mm when the asbestos is loose;

adjusting the speed of the moving paper to 6 cm/h or 20 cm/h and setting a suitable magnification rate for a three-pen note apparatus;

turning on the constant current and voltage electrical source to over-charge said battery;

recording the change in the battery's temperature, voltage, electrical current; and observing and noting any leakage, breach, fume, explosion, or ignition;

recording the battery's charging time at constant current, the battery's highest temperature, and the time it reaches the highest temperature.

This test is terminated when any of the following conditions occur: the battery's surface temperature rises above 200° C.; the battery explodes; the battery is on fire; the over-charge electrical current drops below 50 mA; the battery's voltage reaches the specified voltage and its surface temperature drops below 35° C.

The high temperature properties of the lithium ion secondary batteries of Embodiments 7 through 10 and Comparison Examples 1 and 2 are tested. The results are shown in Table 3. The method for the testing of each battery includes the following steps:

charging a battery to 4.2V with 1 CmA (1 C) at constant current and voltage;

measuring the open circuit voltage and the internal resistance (i.e., the initial voltage, initial internal resistance and initial thickness);

storing the battery for 48 hours at a temperature of 85° C.±2° C.;

measuring the thickness of the battery after storing at 85° C.;

measuring the open circuit voltage and the internal resistance after the battery is placed at a temperature of 23° C.±7° C. for one hour;

discharging the battery to 3.0V with 1 CmA;

recording the discharge capacity (residual capacity);

fully charging the battery;

restoring the battery for five minutes after being fully charged;

discharging the battery to 3.0V with 1 CmA electrical current;

repeating above-described cycle three times;

TABLE 2

| | 1 C, 12 V Over-charge | | | 1 C, 18.5 V Over-charge | | |
| --- | --- | --- | --- | --- | --- | --- |
| | Phenomenon | Longest Time (min) | Highest Temperature (° C.) | Phenomenon | Longest time (min) | Highest Temperature (° C.) |
| Embodiment 1 | No explosion or ignition | 120 | 158 | No explosion or ignition | 100 | 160 |
| Embodiment 2 | No explosion or ignition | 150 | 148 | No explosion or ignition | 120 | 139 |
| Embodiment 3 | No explosion or ignition | 150 | 119 | No explosion or ignition | 150 | 130 |
| Embodiment 4 | No explosion or ignition | 150 | 118 | No explosion or ignition | 150 | 128 |
| Embodiment 5 | No explosion or ignition | 150 | 112 | No explosion or ignition | 150 | 127 |
| Embodiment 6 | No explosion or ignition | 150 | 109 | No explosion or ignition | 150 | 122 |
| Embodiment 7 | No explosion or ignition | 120 | 154 | No explosion or ignition | 100 | 158 |
| Embodiment 8 | No explosion or ignition | 150 | 118 | No explosion or ignition | 150 | 128 |
| Embodiment 9 | No explosion or ignition | 150 | 116 | No explosion or ignition | 150 | 117 |
| Embodiment 10 | No explosion or ignition | 150 | 132 | No explosion or ignition | 120 | 132 |
| Comparison Example 1 | Explosion | 90 | 329 | Explosion | 98 | 333 |
| Comparison Example 2 | Explosion | 91 | 338 | Explosion | 93 | 340 |

Table 2 shows that batteries with electrolytes that are embodiments have good over-charge properties that are distinctly better that the over-charge properties of batteries with electrolytes fabricated in Comparison Examples.

recording the capacity (recovery capacity) of each cycle;

recording the internal resistance (recovery internal resistance) and the thickness (recovery thickness) when the battery is fully charged during the third cycle; and calculating the battery's capacity recovery rate, internal resistance recovery rate and the capacity residue rate with the following formulae:

capacity recovery rate(%)=recovery capacity of the third cycle/initial capacity×100%; internal resistance recovery rate(%)=recovery internal resistance/initial internal resistance×100%;

self discharge rate(%)=(initial capacity−residual capacity)/initial capacity; and residual capacity rate(%)=residual capacity/initial capacity.

TABLE 3

| | 85° C. High-temperature storage property | | | | | |
|---|---|---|---|---|---|---|
| | Storage Internal Resistance Increase (mΩ) | Recovery Internal Resistance Increase (mΩ) | Storage Thickness Increase (mm) | Recovery Thickness Increase (mm) | Self- Discharge Rate (%) | Capacity Recovery Rate (%) | Internal Resistance Recovery Rate (%) |
| Embodiment 7 | 15.8 | 14 | 1.62 | 1.06 | 27.3 | 80.9 | 39.5 |
| Embodiment 8 | 15.9 | 15 | 1.81 | 0.99 | 27.0 | 81.0 | 37.1 |
| Embodiment 9 | 15.5 | 14 | 1.91 | 1.01 | 27.40 | 81.9 | 36.8 |
| Embodiment 10 | 15.2 | 15 | 1.63 | 1.06 | 28.2 | 79.3 | 42.5 |
| Comparison Example 1 | 22.4 | 26 | 2.19 | 1.18 | 33.3 | 71.5 | 69.0 |
| Comparison Example 2 | 21.9 | 25 | 2.22 | 1.17 | 31.4 | 72.5 | 71.1 |

Table 3 shows that batteries with electrolytes that are embodiments of this invention has distinctly improved high temperature storage properties at 85° C. over batteries with electrolytes fabricated in the Comparison Examples. The improvements include increased storage and recovery internal resistance, increased storage and recovery thickness, and improvements in self-discharge rate, capacity recovery rate and inner resistance recovery rate.

The low temperature properties of lithium ion secondary batteries of Embodiments 1 through 8 and Comparison Examples 1 and 2 are tested. The results are shown in Table 4. Each battery is tested as follows:

charging a battery to 4.2V with 1 CmA at constant current and voltage;

discharging to 3.0V with 1 CmA where the initial capacity of the voltage is the discharge capacity;

charging the battery to 4.2V with 1 CmA at constant current and voltage;

discharging the battery is with 1 CmA at a temperature of −10° C.; and recording the capacity and the ending internal resistance when the battery is discharged to 3.1V, 3.0V, and 2.75V.

In Table 4, the medium voltage=(the open circuit voltage after the battery has been placed at −10° C.; for 1.5 hours+ discharge terminal voltage)/2.

TABLE 4

| | −10° C., 1 C Discharge | | | | |
|---|---|---|---|---|---|
| | 3.1 V/ Initial Capacity (%) | 3.0 V/ Initial Capacity (%) | 2.75 V/ Initial Capacity (%) | Medium Voltage (V) | Ending Internal Resistance (mΩ) |
| Embodiment 1 | 38.6 | 40.7 | 45.2 | 3.311 | 52.1 |
| Embodiment 2 | 47.9 | 49.8 | 53.8 | 3.317 | 41.9 |
| Embodiment 3 | 43.9 | 47.7 | 49.9 | 3.315 | 47.5 |
| Embodiment 4 | 42.8 | 47.3 | 48.5 | 3.315 | 49.5 |
| Embodiment 5 | 39.9 | 44.1 | 46.8 | 3.313 | 50.9 |
| Embodiment 6 | 39.2 | 42.3 | 44.9 | 3.312 | 51.9 |
| Embodiment 7 | 38.9 | 41.2 | 45.6 | 3.312 | 52.8 |
| Embodiment 8 | 44.2 | 48.2 | 50.3 | 3.316 | 48.2 |
| Comparison Example 1 | 33.8 | 38.2 | 43.9 | 3.309 | 53.1 |
| Comparison Example 2 | 33.7 | 37 | 43.6 | 3.308 | 53.5 |

The low temperature properties of lithium ion secondary batteries of Embodiments 1 through 8 and Comparison Examples 1 and 2 are tested. The results are listed in Table 5. Each battery is tested as follows:

charging a battery with 1 CmA at constant current and voltage;

discharging to 3.0V with 1 CmA where the discharge capacity is the initial capacity;

charged the battery to 4.2V with 1 CmA at constant current and voltage;

discharging the battery with 1 CmA at a temperature of −20° C.; and recording the capacity and the ending internal resistance when the battery is discharged to 3.1V, 3.0V, and 2.75V.

In Table 5, the medium voltage=(the open circuit voltage after the battery has been placed at −20° C.; for 1.5 hours+ discharge terminal voltage)/2.

TABLE 5

| | −20° C., 1 C Discharge | | | | |
|---|---|---|---|---|---|
| | 3.1 V/ Initial Capacity (%) | 3.0 V/ Initial Capacity (%) | 2.75 V/ Initial Capacity (%) | Medium Voltage (V) | Ending Internal Resistance (mΩ) |
| Embodiment 1 | 27.6 | 28.6 | 40.8 | 3.103 | 56.1 |
| Embodiment 2 | 32.3 | 35.7 | 42.9 | 3.112 | 54.6 |
| Embodiment 3 | 31.9 | 36.3 | 43.6 | 3.112 | 54.9 |
| Embodiment 4 | 30.7 | 33.7 | 41.6 | 3.108 | 53.5 |
| Embodiment 5 | 28.7 | 31.6 | 40.9 | 3.107 | 53.9 |
| Embodiment 6 | 27.7 | 29.7 | 3.65 | 3.104 | 56.9 |
| Embodiment 7 | 27.9 | 29.1 | 41.2 | 3.104 | 56.8 |
| Embodiment 8 | 32.2 | 36.8 | 44.0 | 3.113 | 55.6 |
| Comparison Example 1 | 22.6 | 28.4 | 39 | 3.1 | 57.7 |
| Comparison Example 2 | 20 | 23.7 | 34.9 | 3.099 | 58.7 |

Tables 4 and 5 show that a battery with an electrolyte that is an embodiment has distinctly improved low temperature properties over batteries with electrolytes that are fabricated in the Comparison Examples. A battery with an electrolyte that is an embodiment of this invention has a high capacity when discharged at temperatures of −10° C. and −20° C. This battery also has a high medium voltage when and a low ending internal resistance when discharged at low temperatures. Tables 3 and 4 also show that when there is a larger amount of the additive in the electrolyte, the over-charge properties of the battery are better, but its low-temperature properties declines slightly.

While the present invention has been described with reference to certain preferred embodiments, it is to be understood that the present invention is not limited to such specific embodiments. Rather, it is the contention of the inventor that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. An electrolyte having an additive wherein said additive consists of 1,3-propane sultone, succinic anhydride, ethenyl sulfonyl benzene, and halobenzene, wherein
the weight of said 1,3-propane sultone is between 0.5 wt. % and 96.4 wt. % of the weight of said additive;
wherein the weight of said succinic anhydride is between 0.5 wt. % and 96.4 wt. % of the weight of said additive;
wherein the weight of said ethenyl sulfonyl benzene is between 0.5 wt. % and 95.2 wt. % of the weight of said additive; and
wherein the weight of said halobenzene is between 0.5 wt. % and 95.2 wt. % of the weight of said additive.

2. The electrolyte of claim 1 wherein said halobenzene is fluorobenzene, chlorobenzene, bromobenzene, or iobenzene.

3. The electrolyte of claim 1 wherein the weight of said additive is between 2 wt. % and 20 wt. % of the weight of said electrolyte.

* * * * *